(12) United States Patent
Ganti et al.

(10) Patent No.: US 10,394,720 B2
(45) Date of Patent: Aug. 27, 2019

(54) EFFICIENT CLEARINGHOUSE TRANSACTIONS WITH TRUSTED AND UN-TRUSTED ENTITIES

(71) Applicant: International Business Machines Corporation, Armonk, NY (US)

(72) Inventors: Raghu K. Ganti, Elmsford, NY (US); Mudhakar Srivatsa, White Plains, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/803,206

(22) Filed: Nov. 3, 2017

(65) Prior Publication Data

US 2018/0143912 A1  May 24, 2018

Related U.S. Application Data

(63) Continuation of application No. 15/337,751, filed on Oct. 28, 2016, now Pat. No. 9,824,031.

(51) Int. Cl.
*G06F 12/14* (2006.01)
*G06F 21/00* (2013.01)
*G06Q 20/02* (2012.01)
*H04L 9/32* (2006.01)

(52) U.S. Cl.
CPC .......... *G06F 12/1408* (2013.01); *G06F 21/00* (2013.01); *G06Q 20/023* (2013.01); *H04L 9/3236* (2013.01); *H04L 2209/38* (2013.01); *H04L 2209/56* (2013.01)

(58) Field of Classification Search
CPC ... G06F 12/1408; G06F 21/00; G06Q 20/023; H04L 2209/56
See application file for complete search history.

(56) References Cited

U.S. PATENT DOCUMENTS

| | | | |
|---|---|---|---|
| 3,738,491 A | 6/1973 | Dockery | |
| 7,376,712 B1 * | 5/2008 | Granatelli | G05B 23/0267 702/188 |
| 8,738,491 B1 | 5/2014 | Pettay et al. | |
| 2003/0229586 A1 | 12/2003 | Repak | |

(Continued)

*Primary Examiner* — Yonas A Bayou
(74) *Attorney, Agent, or Firm* — Scully, Scott, Murphy & Presser, P.C.; Grant Johnson, Esq.

(57) ABSTRACT

In an aspect of the present disclosure, a method is disclosed including receiving first transaction data from a first trusted party that includes a first pending transaction between the first trusted party and a second trusted party and a second pending transaction between the first trusted party and an un-trusted party. The method further includes receiving second transaction data from the second trusted party that includes a third pending transaction between the second trusted party and the un-trusted party. The method further includes analyzing the first and second transaction data to determine whether more than one trusted party has a pending transaction with the same un-trusted party, determining that the first trusted party and the second trusted party each have a pending transaction with the un-trusted party, and modifying the first pending transaction, the second pending transaction, and the third pending transaction. The modification includes removing the third pending transaction.

14 Claims, 8 Drawing Sheets

(56) References Cited

U.S. PATENT DOCUMENTS

| | | | |
|---|---|---|---|
| 2004/0186912 A1* | 9/2004 | Harlow | G06Q 20/40 709/237 |
| 2005/0182956 A1* | 8/2005 | Ginter | G06F 21/10 713/193 |
| 2006/0206423 A1* | 9/2006 | Sternard | G06Q 20/102 705/40 |
| 2007/0226122 A1* | 9/2007 | Burrell | G06Q 20/3821 705/37 |
| 2009/0271328 A1* | 10/2009 | Bloom | G06Q 40/04 705/36 R |
| 2010/0185847 A1* | 7/2010 | Shasha | G06F 11/1004 713/150 |
| 2010/0235277 A1 | 9/2010 | Van Rensburg et al. | |
| 2012/0221460 A1 | 8/2012 | Chang | |
| 2013/0091059 A1* | 4/2013 | Stals | G06Q 20/02 705/44 |
| 2013/0339212 A1* | 12/2013 | Frankel | G06Q 40/00 705/37 |
| 2014/0052602 A1* | 2/2014 | Spirgel | G06Q 40/00 705/37 |
| 2014/0236811 A1 | 8/2014 | Etchegoyen | |
| 2014/0279355 A1* | 9/2014 | Merk | G06Q 40/00 705/37 |
| 2016/0110808 A1* | 4/2016 | Yu | G06Q 40/04 705/37 |
| 2017/0024818 A1* | 1/2017 | Wager | G06Q 40/04 |

\* cited by examiner

EFFICIENT CLEARINGHOUSE TRANSACTIONS WITH TRUSTED AND UN-TRUSTED ENTITIES

CROSS-REFERENCE TO RELATED APPLICATIONS

The present application is a continuation of U.S. patent application Ser. No. 15/337,751, filed Oct. 28, 2016 the content of which is incorporated herein by reference in its entirety.

GOVERNMENT LICENSE RIGHTS

This invention was made with government support under Contract No.: W911NF-06-3-0001 awarded by Army Research Office (ARO). The government has certain rights to this invention.

TECHNICAL FIELD

The present disclosure relates to the reduction in the number of transactions required for settlement between a group of trusted and un-trusted parties and, in some aspects the number of transactions that require the use of a clearinghouse.

BACKGROUND

Clearinghouses are third party financial institutions that provide clearing and settlement services for financial, derivatives, and securities transactions between two parties. Often the parties utilize a clearinghouse when they do not have a prior relationship or have not developed a level of trust that each party will uphold the terms of the transaction. A clearinghouse, as a third party, provides security and enforcement services for transactions that ensure that each party will perform as required under the transaction. For example, the clearinghouse will often receive collateral from each party prior to clearing the transaction that may be utilized in the event of a default on the transaction by either party.

The trust level between two parties can vary from fully trusted to fully un-trusted. Parties that fully trust each other often will settle transactions directly without the use of a third-party intermediary such as a clearinghouse. On the other hand, parties that do not trust each other or do not have prior experience with each other will often utilize the services provided by a clearinghouse to ensure that the transaction will be enforced or in the event of a default by one of the parties that the other party will not be harmed.

Existing solutions are focused on efficient inter-institution transfers with a single trusted authority such as a clearinghouse. Since all of transactions are settled through the clearinghouse, additional communications and transmissions may be necessary thus making it inefficient and expensive for the financial institutions.

BRIEF SUMMARY

The system, method, and computer program product described herein provide for coalescing of transaction between trusted and un-trusted parties.

In an aspect of the present disclosure, a method is disclosed. The method includes receiving first transaction data from a computing device associated with a first trusted party. The first transaction data includes a first pending transaction between the first trusted party and a second trusted party and a second pending transaction between the first trusted party and an un-trusted party. The method further includes receiving second transaction data from a computing device associated with the second trusted party. The second transaction data includes a third pending transaction between the second trusted party and the un-trusted party. The method further includes analyzing the first and second transaction data to determine whether more than one trusted party has a pending transaction with the same un-trusted party, determining based on the analysis that the first trusted party and the second trusted party each have a pending transaction with the un-trusted party, and modifying the first pending transaction, the second pending transaction, and the third pending transaction based on the determination. The modification includes removing the third pending transaction.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

Figure 1:
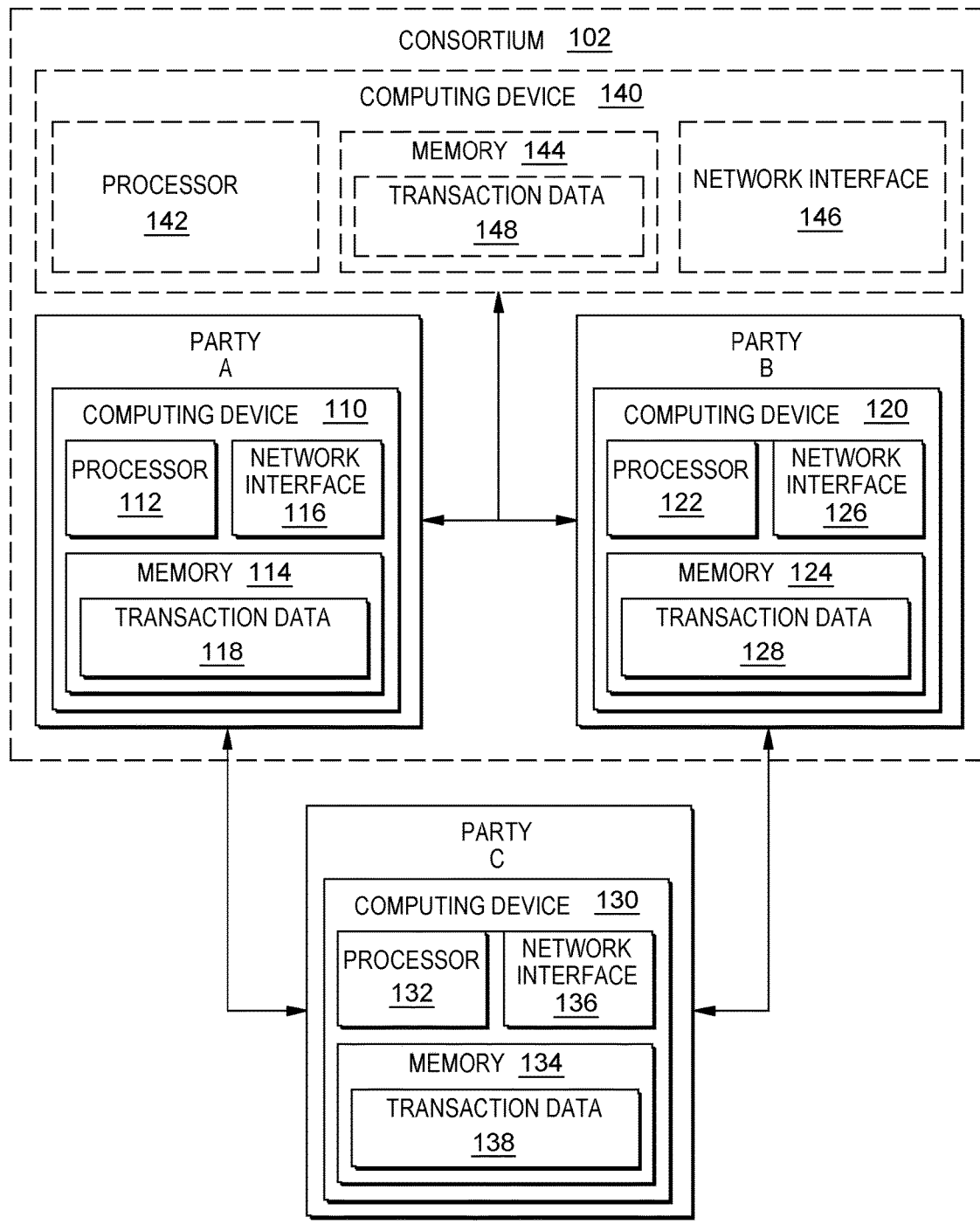
FIG. 1 is a system diagram illustrating components of a system in accordance with an aspect of the present disclosure.

The present disclosure provides methods and systems to reduce the number of transactions required for settlement between a group of trusted and un-trusted parties and, in some aspects the number of transactions that require the use of a clearinghouse.

Trust level between two parties can be either fully trusted or fully un-trusted. In a fully trusted scenario, transactions between these parties need not go to a clearinghouse and instead may be settled directly between the parties. In a fully un-trusted scenario, all transactions between the parties will often be settled through a clearinghouse.

The use of a clearinghouse for all transactions between un-trusted parties may be both inefficient and expensive. For example, additional communications or transmissions may be required between each party and the clearinghouse, and between the clearinghouse and each party, to settle the transaction. In addition, the use of a clearinghouse may create a delay in the settlement of the transaction depending on the nature of the transaction, the clearinghouse, the market, or other factors. The preset disclosure provides ways to reduce the number of transactions that must go to the clearinghouse for settlement in a multi-party environment including more than two parties and including both trusted and un-trusted parties. Aspects of the present disclosure also provide ways to reduce or consolidate a total number of transactions between parties in a multi-party environment.

A multi-party environment may provide fully trusted parties with an opportunity to more efficiently settle transactions and in some aspects may reduce the number of transactions required for settlement. For example, with reference now to FIG. 1, party A is fully trusted by party B, party B is fully trusted by party A, and party C is fully un-trusted by both parties A and B and parties A and B are both fully un-trusted by party C. In some aspects, for example, parties A and B may be part of a consortium 102 of fully trusted parties while party C may not be part of the consortium 102 of fully trusted parties and therefore may be considered an un-trusted party by the group 102. For example, parties A and B may be part of a consortium of banks, exchanges, financial institutions, or other entities while party C may be a single entity that is not part of the consortium. For example, the parties may form the consortium 102 as a way of vetting or establishing trust between parties within the consortium 102. For example, parties that wish to enter the consortium 102 may be required to verify or validate their level of trust, secure their level of trust using collateral, or establish trust in some other manner. The consortium 102 may include rules that must be followed by each member party. For example, the consortium 102 may include capitalization rules, collateral rules, or other similar rules that ensure that the parties within the consortium 102 will not default when transacting directly with each other. As an example, parties A and B may be part of a consortium 102 and therefore fully trusted by each other while party C may not be part of the consortium and therefore may not be trusted by parties A and B. Although the consortium 102 is described with reference to parties A and B, additional parties may also be part of consortium 102 and may be considered fully-trusted parties by parties A and B.

In some aspects, the parties may also or alternatively have a direct trusted relationship outside of a consortium. For example, party A and party B may have a long standing business relationship, may settle a large volume of transactions with each other on a daily basis, or other similar relationships that may allow parties A and B to consider each other fully trusted parties, for example, based on prior performance or past history.

Party A may include a computing device 110, for example, a personal computer, laptop, tablet, smart phone, smart wearable device, server, server cluster, cloud computing system, or any other computing device that may be used to submit or settle transactions between party A and other parties. Computing device 110 may include at least one processor 112, memory 114, and a network interface 116.

Processor 112 may include, for example, a microcontroller, Field Programmable Gate Array (FPGA), or any other processor that is configured to perform various operations. Processor 112 may be configured to execute software instructions. These instructions may be stored, for example, in memory 114.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 116 is configured to transmit and receive data or information between parties via wired or wireless connections. For example, network interface 116 may utilize wireless technologies and communication protocols such as Bluetooth®, WWI (e.g., 802.11a/b/g/n), cellular networks (e.g., CDMA, GSM, M2M, and 3G/4G/4G LTE), near-field communications systems, satellite communications, or any other form of communication that allows computing device 112 to transmit or receive information. Network interface 116 may allow computing device 112 to communicate directly with computing devices associated with one or more other parties. In some aspects, network interface 116 may communicate computing devices of other parties via an intermediary network, for example, a local area network (LAN), wide area network (WAN), the internet, or other similar networks.

In some aspects, party A may store transaction data 118 in memory 114. Transaction data 118 may include, for example, an identification of any transactions that are currently pending for party A, an amount or value associated with the pending transactions, and an identification of a counterparty for each transaction. In some aspects, transaction data may also include an indication of whether the counterparty for each transaction is a fully-trusted party or a fully un-trusted party. For example, transaction data 118 may be a registry of all pending transactions for a party A.

In some aspects, parties B and C may also include respective computing devices 120 and 130. Computing devices 120 and 130 are similar to computing device 110 and may include similar features as computing device 110. For example, computing device 120 may include at least one processor 122, memory 124, and a network interface 126 similar to computing device 110. Memory 124 may store transaction data 128 similar to transaction data 118 for transactions associated with party B. Transaction data 128 may be a registry of all pending transactions for party B. Likewise, computing device 130 may include at least one processor 132, memory 134, and a network interface 136 similar to computing device 110. Again, memory 134 may store transaction data 138 similar to transaction data 128. Transaction data 138 may be a registry of all pending transactions for party C.

In some aspects, party A may provide transaction data 118 to party B via network interfaces 116 and 126 and party B may provide transaction data 128 to party A via network interfaces 116 and 126. In some aspects, party C may provide transaction data 138 to either or both of parties A and B via network interfaces 116, 126, and 136.

In some aspects, consortium 102 may also include a computing device 140 similar to computing device 110. Computing device 142 may include at least one processor 142, memory 144, and a network interface 146 similar to computing device 110. In some aspects, for example, consortium 102 may receive transaction data 118 and transaction data 128 from computing devices 110 and 120 of parties A and B via network interfaces 116, 126, and 146, and may store the received transaction data 118 and 128 as transaction data 148 in memory 144.

Figure 2:
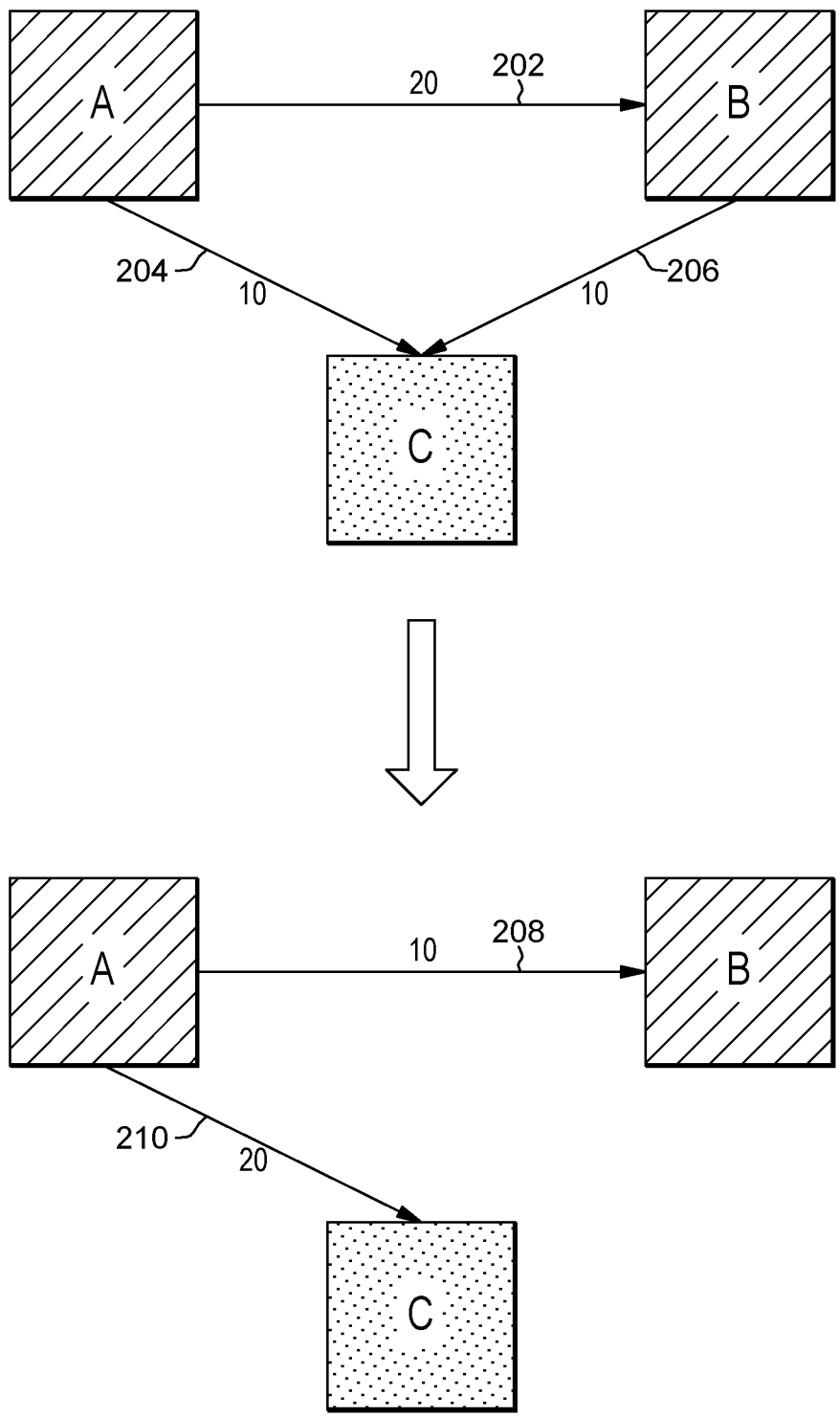
FIG. 2 is a diagram illustrating transactions between trusted and un-trusted parties in accordance with an aspect of the present disclosure.

Referring now to FIGS. 1 and 2, in one example, party A may have a pending transaction 202 to transfer twenty units to party B. The units may be any transferrable item including, for example, currency, stocks, bonds, derivatives, treasuries, collateral, or any other item that is transferrable by a transaction. Party A may also have a pending transaction 204 to transfer ten units to party C. Party B may have a pending transaction 206 to transfer ten units to party C. Since parties A and B are fully-trusted, no clearinghouse is necessary and parties A and B may settle pending transaction 202 directly with one another. Since party C is not trusted by party A (and vice-versa), transaction 204 will be settled through the use of a clearinghouse. Likewise, since party C is not trusted by party B (and vice-versa), transaction 206 will also be settled through the use of a clearinghouse.

In some aspects, parties A and B, as fully trusted parties, may share respective transaction data 118, 128 with one another. For example, computing device 110 of party A may transmit transaction data 118 on transactions 202 and 204 to computing device 120 of party B via network interfaces 116 and 126, and computing device 120 of party B may transmit transaction data 128 on transactions 102 and 206 to computing device 110 of party A via network interfaces 116 and 126. The transaction data 118 and 128 may, for example, be stored in the respective memory 114, 128 of computing devices 110 and 112 of parties A and B.

In some aspects, parties A and B may share transaction data 118 and 128 for transactions 202, 204, and 206 with consortium 102. For example, computing device 110 of party A may transmit transaction data 118 on transactions 202 and 204 to computing device 140 of consortium 102 via network interfaces 116 and 146, and computing device 120 of party B may transmit transaction data 128 on transactions 202 and 206 to computing device 140 of consortium 102 via network interfaces 126 and 146. The transaction data 118 and 128 may, for example, be stored in the memory 144 of computing devices 140 of consortium 102 as transaction data 148.

In some aspects, for example, computing device 140 may analyze the received transaction data 128 to determine whether any of transactions 202 and 206 pending for fully trusted party B are with a fully un-trusted counterparty. In some aspects, the analysis may be performed by a computing device of any other fully trusted party, e.g., computing device 110 of party A or computing device 120 of party B.

In some aspects, for example, computing device 140 may analyze transaction 202 based on transaction data 118 and 128 and determine that transaction 202 is between two fully trusted parties, e.g., party A and party B. Computing device 140 may also analyze transaction 206 based on transaction data 118 and 128 and determine that transaction 206 is between fully trusted party B and fully un-trusted party C. Computing device 140 may also analyze transaction 204 based on transaction data 118 and 128 and determine that transaction 204 is between party A and fully un-trusted party C. These determinations may, for example, be based on a comparison of the parties to the transactions, as stored in transaction data 118 and 128 for transactions 202, 204, and 206, to a list or database of fully trusted parties stored in memory 144. In some aspects, for example, the computing device 140 may compare the parties to a transaction as stored in transaction data 118 and 128 with a list or database of fully trusted parties stored in memory 114 of computing device 110 or memory 124 of computing device 120. In some aspects, for example, computing device 140 may receive a list of fully trusted parties from one or both of computing devices 110 and 120 with transaction data 118 and 128.

When computing device 140 determines that a transaction is between a fully trusted party and a fully un-trusted party, computing device 140 may determine whether there are additional transactions between another party and the same fully un-trusted party. For example, computing device 140 may determine that each of transactions 204 and 206 is associated with the same fully un-trusted party C. Once an association between transactions 204 and 206 is identified, computing device 140 may identify the counterparties to transactions 204 and 206, e.g., parties A and B, and may determine whether both counterparties A and B are fully trusted parties. In this case, computing device 140 would determine that both parties A and B are fully trusted.

Computing device 140 may also determine whether there are any pending transactions between fully trusted parties A and B. For example, computing device 140 may analyze transaction data 148 (which includes transaction data 118 and transaction data 128 received from computing devices 110 and 120) to determine whether there are any pending transactions between parties A and B, e.g., transaction 202.

In summary, computing device 140 may determine, for example, based on the above determinations that fully trusted party A and fully trusted party B each have a pending transaction with fully un-trusted party C and that fully trusted party A also has a pending transaction with fully trusted party B. Based on this determination, computing device 140 may determine or identify a more efficient set of transactions to satisfy these pending obligations. For example, computing device 140 may consolidate the three transactions 202, 204, and 206 into a pair of transactions, e.g., 208 and 210.

With continued reference to FIGS. 1 and 2, for example, computing device 140 may generate a new set of consolidated transactions between parties A, B, and C, including transactions 208 and 210 to replace the set of transactions including transactions 202, 204, and 206. For example, computing device 140 may shift the ten units from transaction 206 to party A, reducing the twenty units to be transferred under transaction 202 by ten units. This results in a transaction 208 between parties A and B of the transfer of ten units from party A to party B. Since party C is now short the ten units from party B, computing device 140 may have party A make-up the shortfall by increasing the ten units to be transferred to party C under transaction 204 to twenty units. This results in a transaction 210 between parties A and C of the transfer of twenty units from party A to party C. In this manner, the number of transactions between a fully trusted party, e.g., parties A and B, and a fully un-trusted party, e.g., party C, may be reduced. This provides the benefit of a reduced number of transactions on the network as a whole and also a reduced number of communications between the parties on the network and a clearinghouse. For example, network traffic as a whole may be reduced by eliminating extra transactions.

In some aspects, eliminating or reducing the number of transactions between fully trusted parties and fully un-trusted parties also reduces the additional costs in both time and money associated with using a clearinghouse. For example, by consolidating the set of transactions 202, 204, and 206 into a new reduced set of transactions 208 and 210, and entire transaction between a fully trusted party and a fully un-trusted party may be eliminated. By eliminating transaction 206, party B may reduce overall costs associated with using a clearinghouse. In some aspects, the cost reduction obtained by party B may be shared with party A. For example, since party A has assisted party B in eliminating a transaction with a fully un-trusted party, party A may share in the benefit of the elimination, namely any savings made by party B in not using the clearinghouse. For example, in some aspects, party A may share or split the savings with party B. In some aspects, for example, party A may gain a commission, e.g., 10% of the savings, in return for assisting party B.

In some aspects, computing device 140 may transmit transactions 208 and 210 to computing device 130 via network interfaces 136 and 146 for approval by party C. For example, since party C will no longer be any units from party B, but is receiving additional units from party A, computing device 140 may require acceptance of transactions 208 and 210 by party C before replacing transactions 202, 204, and 206 with transactions 208 and 210. For example, computing device 140 may wait for receipt of a confirmation or acceptance of transactions 208 and 210 from computing device 130 before providing parties A and B with replacement transactions 208 and 210. Once confirmation or acceptance is received form computing device 130, computing device 140 may replace transactions 202, 204, and 206 with transactions 208 and 210 in transaction data 148 and may push the updated transaction data 148 down to the computing devices 110 and 120 of parties A and B. Computing devices 110 and 120 may update transaction data 118 and 128 to replace transactions 202, 204, and 206 with transactions 208 and 210 as necessary. For example, transaction data 118 may be updated to remove transactions 202 and 204 and include transactions 208 and 210 while transaction data 128 may be updated to remove transaction 206 and include transaction 208.

In some aspects, rather than replacing transactions 202, 204, and 206, the set of transactions 208 and 210 may alternatively be modifications of transactions 202 and 204, respectively, and transaction 206 may be canceled or removed.

Any portion of the above analysis may also or alternatively be performed by a computing device associated with any fully trusted party, e.g., computing devices 110 and 120, based on transaction data received from one or more of the fully trusted parties. In some aspects, the analysis may be performed by one or more of computing device 110, computing device 120, and computing device 140.

Figure 3:
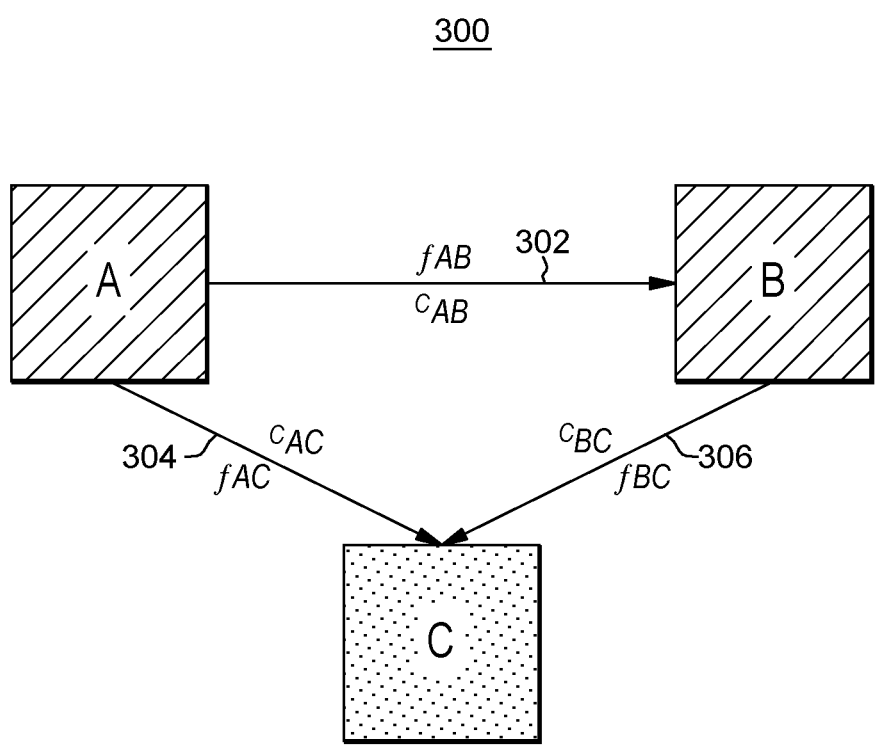
FIG. 3 is a diagram illustrating a min-cost flow formulation in accordance with an aspect of the present disclosure.

The analysis by computing device 140 will now be described in more detail with reference to FIGS. 1-3. For example, computing device 140 may analyze the transaction data 148 (which includes transaction data 118 and 128) according to a min-cost flow formulation 300 as illustrated in FIG. 3. Although described with reference to parties A, B, and C, it is contemplated that a much larger pool of fully trusted parties and fully un-trusted parties may be analyzed by the min-cost flow formulation 300.

Min-cost flow formulation 300 utilizes a transaction graph, e.g., the graph shown in FIG. 2, that identifies a source party and a sink party for each transaction. In some aspects, transaction data associated with each party may include a transaction graph for that party. In some aspects, computing device 140 may generate a master transaction graph based on the transaction data received from each party. For example, transaction data 118 of party A may include transaction 202 between party A and party B and transaction 204 between party A and party C and transaction data 128 may include transaction 202 between party A and party B and transaction 206 between party B and party C. The master transaction graph generated by computing device 140 based on transaction data 118 and 128 may include all of the transactions between fully trusted parties and between at least one fully trusted party and a fully un-trusted party. For example, the master transaction graph may include transactions 202, 204, and 206 as illustrated, for example, in FIG. 2.

In some aspects, with reference again to FIG. 3, each transaction 302, 304, and 306 has a cost function C and a flow function $f$. For example, transaction 302 has a cost function $C_{AB}$ and a flow $f_{AB}$. Cost function C is a cost of a transaction. Between parties that are fully trusted, for example, there may be no or minimal cost associated with the transaction. Between parties that are fully un-trusted, the cost C may be greater than zero, for example, the cost of using of a clearinghouse. For example, $C_{AB}$ for transaction 302 may be zero while $C_{AC}$ for transaction 304 may be equal to the fee charged by the clearinghouse for transaction 304. The cost may also include a time loss associated with using a clearinghouse to settle transactions with the un-trusted parties.

Flow function $f$ is the volume or number of transactions. For example, with reference to FIG. 2, the flow $f_{AB}$ of transaction 202 may be one transaction for twenty units. In some aspects, a party may have multiple transactions with the same counterparty. For example, in some aspects, $f_{AC}$ may include multiple transactions. In some aspects, the flow function may affect or determine the cost of using a clearinghouse. For example, if the flow function $f$ between a fully trusted party and a fully un-trusted party includes multiple transactions, the cost C may be increased based on each additional transaction. In some aspects, consolidating transactions between a fully trusted party and a fully un-trusted party may allow for a reduction in both the required number of transactions that need to be made and the clearinghouse costs associated with the extra transactions.

In some aspects the cost function C and flow function $f$ for each transaction or set of transactions may be determined from the transaction data 118 and 128. For example, each pending transaction may include an identification of the cost C associated with that transaction and the flow $f$ for that transaction, e.g., the number of units transferred and number of transactions. Computing device 140 may then perform the analysis described above by attempting to minimize the costs and flows in the following equation:

$$\min \Sigma f_{ij} C_{ij} \qquad (1)$$

Where i denotes the source party and j denotes the sink party, e.g., party A and party B. For example, computing device 140 may minimize the costs and flows by replacing or modifying transactions 202, 204, and 206 as described above with respect to FIG. 2 to transactions 208 and 210.

In some aspects, parties A, B, and C may require a way to easily and positively verify the change or replacement of transactions based on the analysis. For example, party C may require a way to verify that transaction 206 that was originally supposed to occur between party B and party C now will be fulfilled by party A in transaction 210. Likewise, party A may require a way to verify that transaction 202 between party A and party B is modified or replaced by transaction 208 that has a reduced number of units as compared to transaction 202 based on party A increasing the number of units in transaction 210 to include the number of units found in transaction 206.

In some aspects, for example, a blockchain may be used as a transparent and auditable register of transactions.

Blockchain technology was developed as a way of providing a publicly transparent and decentralized ledger that is configured to track and store digital transactions in a publicly verifiable, secure, and hardened manner to prevent tampering or revision.

A typical blockchain includes three primary functions: read, write, and validate. For example, a user of the blockchain must have the ability to read the data that resides on the blockchain. A user of the blockchain must also have the ability to write, e.g. append, data to the blockchain. Every write operation starts out as a proposed transaction that is posted on the network. The proposed transaction may not always be valid, for example, it may be malformed (syntax errors), or it may constitute an attempt to perform a task for which the submitter is not authorized. Validation refers to filtering out invalid transactions and then deciding on the exact order for the remaining, valid, transactions to be appended to the blockchain as part of a new block.

Once ordered, the transactions are packaged into a new block, and the new block is voted on by the validator nodes associated with the blockchain to determine whether to add the new block to the blockchain. If a consensus to add the new block is reached, e.g., a threshold number of "for" votes, the new block may be appended to the blockchain. Each new block that is appended to the blockchain also includes a hash of the previous block. Accordingly, as each new block is added, the security and integrity of the entire blockchain is further enhanced. It is important to note that once data is written to the blockchain, for example, once a block including a set of transactions has been appended to the blockchain, that data can no longer be altered or modified.

Figure 4:
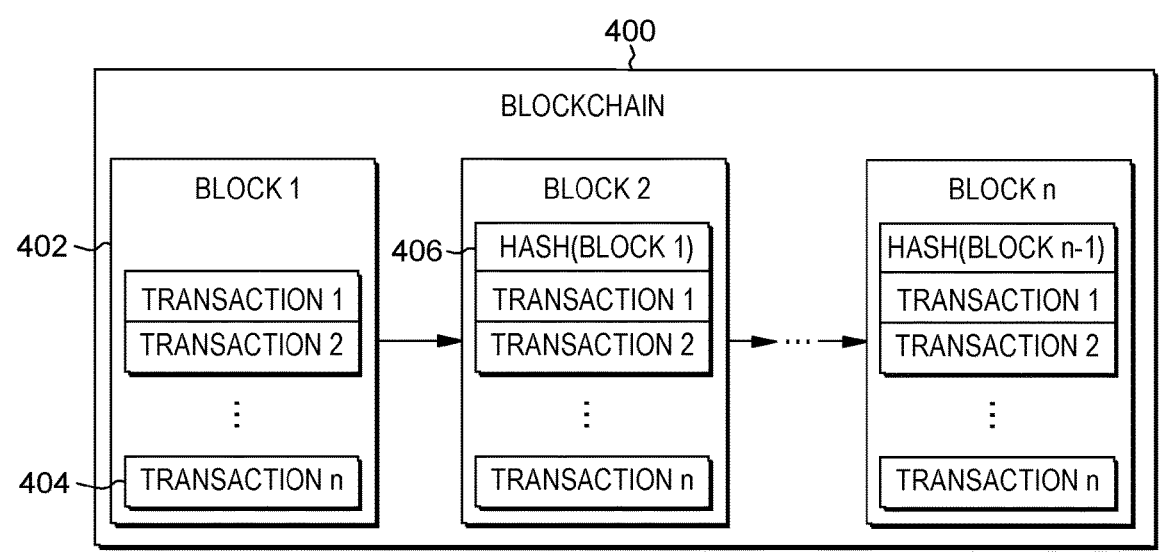
FIG. 4 is a system diagram illustrating a blockchain in accordance with an aspect of the present disclosure.

With reference now to FIG. 4, a blockchain 400 includes a plurality of data blocks 402. Each data block 402 is a data structure that includes data representing transactions 404, for example, transactions 202, 204, 206, 208, and 210 (FIG. 2) or any other transaction. As described above, as new transactions 404 are submitted to the blockchain 400 and validated by validator nodes, additional data blocks 402 are generated by the validator nodes and appended to the blockchain 400. Each new data block 402 includes a set of validated transactions 404 and a hash 406 of the content of the immediately previous data block 402. For example, data block "2" includes a hash of the content of block "1", block "n" includes a hash of the content of block "n-1", etc. Some non-limiting examples of blockchains include Bitcoin®, Ethereum®, OpenLedger™, or other similar blockchains.

Figure 5:
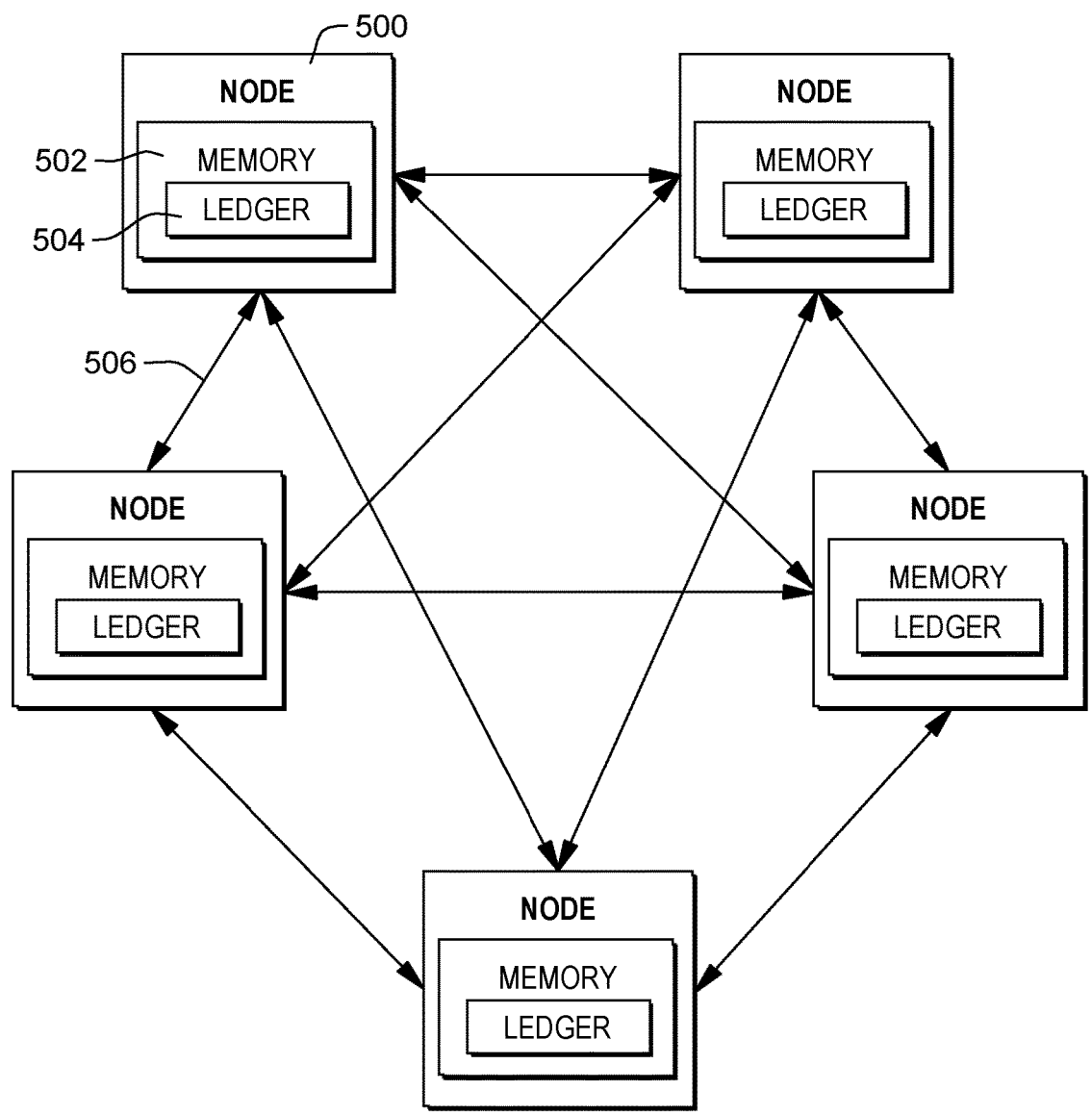
FIG. 5 is a system diagram illustrating nodes associated with the blockchain of FIG. 1 and storing the ledger of the blockchain of FIG. 1 in accordance with an aspect of the present disclosure.

With reference now to FIG. 5, in some aspects, blockchain 400 is stored in a decentralized manner on a plurality of nodes 500, e.g., computing devices located in one or more networks. Nodes 500 may each include a memory 502 that stores at least a portion of a ledger 504 of blockchain 400. Ledger 504 includes any data blocks 402 that have been validated and added to the blockchain 400. In some aspects, every node 500 may store the entire ledger 504. In some aspects, each node 500 may store a portion of ledger 504. In some aspects, some or all of blockchain 400 may be stored in a centralized manner. Nodes 500 may communicate with one another via communication pathways 506, e.g., wired or wireless connections, over the internet, etc. to transmit and receive data related to ledger 504. For example, as new data blocks 402 are added to ledger 504, nodes 500 may communicate or share the new data blocks 402 via communication pathways 506. In some aspects, some or all of nodes 500 may be operated computing devices associated with fully trusted parties, for example, computing devices 110, 120, and 140. In some aspects, some or all of nodes 500 may be operated by computing devices associated with any parties that have transactions with the fully trusted parties including, for example, computing devices 110, 120, 130, and 140. In some aspects, party C may have read-only access to blockchain 400.

Figure 6:
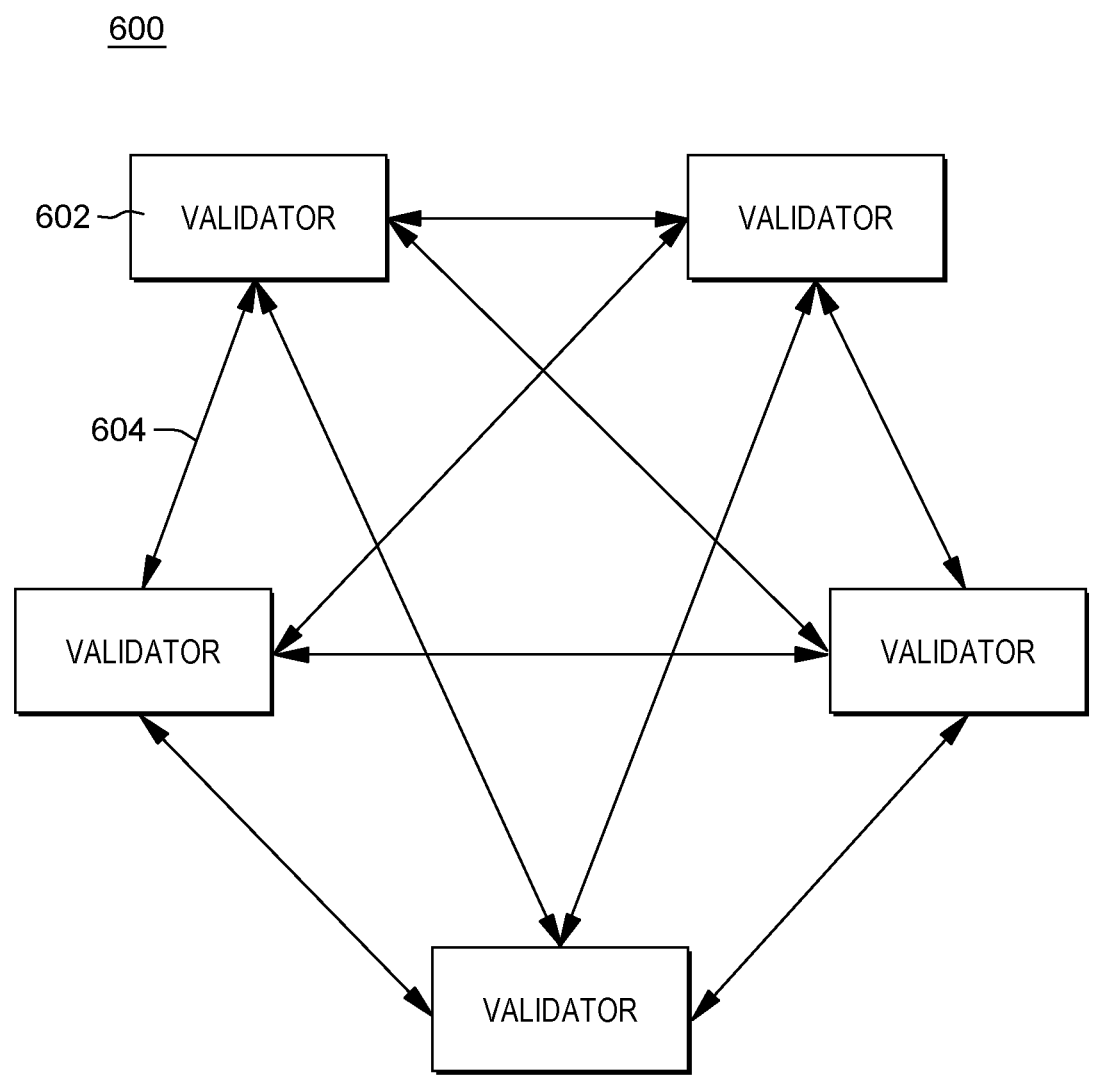
FIG. 6 is a system diagram illustrating validator nodes associated with the blockchain of FIG. 1 in accordance with an aspect of the present disclosure.

With reference now to FIG. 6, any transactions 404 submitted to blockchain 400 are validated by a set of validator nodes 600 associated with blockchain 400. For example, transactions 404 may be transmitted to one or more of the validator nodes 600 and may be shared between the validator nodes 600 for validation and consensus. Each validator node 602 determines whether a transaction 404 is valid and whether the transaction 404 complies with the rules of the blockchain 400. The validator node 602 adds a plurality of the validated transactions 404 to a data block 402 and submits the data block 402 for consensus by all or some of the other validator nodes. The other validator nodes 602 then vote "for" or "against" appending the data block 402 containing the transactions 404 to the blockchain 400. A consensus of the set of validator nodes 600, e.g., a threshold number of identical votes "for" or "against", is required to allow or deny the data block 402 to be appended to the blockchain 400. In some aspects, one or more of nodes 500 may also be validator nodes 600. In some aspects, nodes 500 that are not validator nodes 600 may perform processing such as, for example, receiving transaction submissions, providing member services, handling application programming interface (API) requests from users, or other similar functions. In this manner, the processing power of the validator nodes 600 may be preserved for generating new blocks, reaching consensus, and monitoring the other validator nodes 600. Validator nodes 600 may communicate with one another via communication pathways 604, e.g., wired or wireless connections, over the internet, etc., to transmit and receive data. For example, as new data blocks 402 are generated by validator nodes 602, validator nodes 602 may communicate or share the new data blocks 402 and transmit and receive consensus messages via communication pathways 604.

In some aspects, some or all of computing devices 110, 120, and 140 may be associated with the blockchain 400. For example, computing devices 110, 120, and 140 may act as nodes 500 or validator nodes 600 of blockchain 400 and may each store some or all of ledger 504. In some aspects, computing device 140 may submit a change transaction for addition to blockchain 400 based on the min-cost flow analysis. For example, the change transaction may identify the original transaction that is being replaced or modified, and any other transactions that are replaced or modified. For example, computing device 140 may submit a change transaction according to FIG. 2 to blockchain 400 including an identification of transactions 202, 204, and 206 as transactions to be modified or replaced and transactions 208 and 210 as the replacement transactions.

In some aspects, party C may query blockchain 400, for example, by submitting a query to nodes 500 or validator nodes 600 to determine how the changes have occurred. For example, where party C was expecting transactions for ten units from each of parties A and B under transactions 204 and 206, party C may now verify that it will instead receive twenty units from party A under a new transaction 210 by querying blockchain 400.

In some aspects, the change transaction may include a signature by party C, for example, using a private key of party C. For example, computing device 140 may the change transaction to party C for approval prior to submitting the change transaction for addition to the blockchain 400. Party C may, for example, use computing device 130 to digitally sign the change transaction, e.g., using a private key of party C, and may transmit the digitally change transaction back to computing device 140 as an acceptance of the change transaction. The change transaction including the digital signature may then be added to blockchain 400 and may be verified by parties A, B, and C.

In addition, party B may query blockchain 400 to confirm that its obligation under transaction 206 to provide ten units to party C has been met by transaction 210 between party A and party C. Finally, party A may query blockchain 400 to confirm that the twenty units found in transaction 202 has been reduced to ten units in transaction 208 in exchange for party A taking on the obligation to send 10 more units to party C in transaction 210. In some aspects, parties A and B may also be required to digitally sign the change transaction prior to the change transaction being submitted to for addition to blockchain 400.

Figure 7:
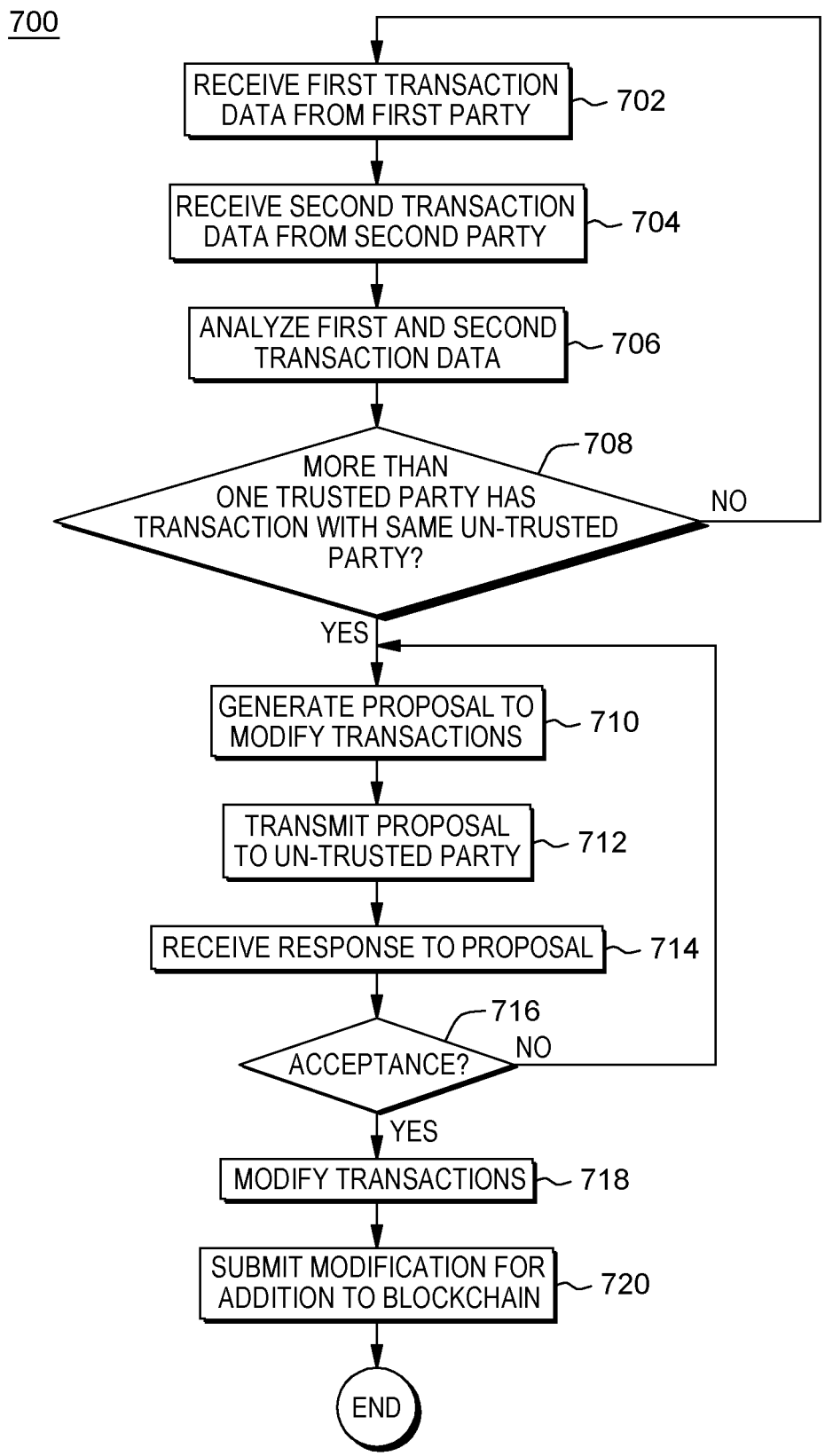
FIG. 7 is a flow chart of a method according to an embodiment of the present disclosure.

With reference now to FIG. 7, a method 700 for coalescing transactions between trusted and un-trusted parties is disclosed. In some aspects, the method 700 may be implemented, for example, by computing device 140 of consortium 102. In some aspects, method 700 may be implemented by some or all of computing device 110, computing device 120, and computing device 140.

At 702, first transaction data is received from a computing device associated with a first trusted party, e.g., transaction data 118 is received by computing device 140 from computing device 110 associated with party A. The first transaction data comprises a first pending transaction between the first trusted party and a second trusted party and a second pending transaction between the first trusted party and an un-trusted party. For example, first transaction data 118 includes transaction 202 between fully trusted parties A and B and transaction 204 between fully trusted party A and fully un-trusted party C.

At 704, second transaction data is received from a computing device associated with the second trusted party, e.g., transaction data 128 is received by computing device 140 from computing device 120 associated with party B. The second transaction data includes a third pending transaction between the second trusted party and the un-trusted party. For example, second transaction at 128 includes transaction 206 between fully trusted party B and fully un-trusted party C. In some aspects, transaction data 128 may also include transaction 202.

At step 706, the first and second transaction data is analyzed to determine whether more than one trusted party has a pending transaction with the same un-trusted party. For example, computing device 140 may generate a transaction graph based on transaction data 118 and 128 and may apply a min-cost flow formulation to the received transaction data 118, 128.

At 708, the computing device determines whether the first trusted party and the second trusted party each have a pending transaction with the un-trusted party. For example, computing device 140 may determine based on the analysis that both fully trusted party A and fully trusted party B have a pending transaction with fully un-trusted party C, e.g., transactions 204 and 206. If it is determined that more than one trusted party does not have a transaction with the same un-trusted party, the method may return to 702 and new or updated transaction data may be received. Otherwise, the method proceeds to 710.

At 710, the computing device generates a proposal to modify the transactions based on the determination that each party has a pending transaction with the un-trusted party.

At 712, the proposal may be transmitted to the un-trusted party and in some aspects to at least one of the trusted parties and/or the clearinghouse. For example, computing device 140 may transmit the proposal to computing device 130 of party C for acceptance. In some aspects, the proposal may also or alternatively be transmitted to computing devices 110 and 120 of parties A and B for acceptance. In some aspects, the proposal may also or alternatively be transmitted to a computing device associated with the clearinghouse that would be settling the proposed transaction or any of the modified transactions.

At 714, the computing device receives a response to the proposal from the un-trusted party. For example, computing device 140 may receive a response from computing device 130 of party C. In some aspects, if a proposal was transmitted to computing devices 110 and 120 of parties A and B, computing device 140 may also receive the response from computing device 110 and 120.

At 716, the computing device determines whether the response(s) is (are) an acceptance of the proposal. If the response is not an acceptance, the method may return to 710 and a new proposal to modify the transaction(s) may be generated. If the response is an acceptance, the method proceeds to 718.

At 718, in response to the acceptance, the computing device modifies the first pending transaction, the second pending transaction, and the third pending transaction based on the proposal. In some aspects, the modification may include removing the third pending transaction.

At 720, in some aspects, the modification may be submitted to a computing device associated with a blockchain for addition to the blockchain.

Figure 8:
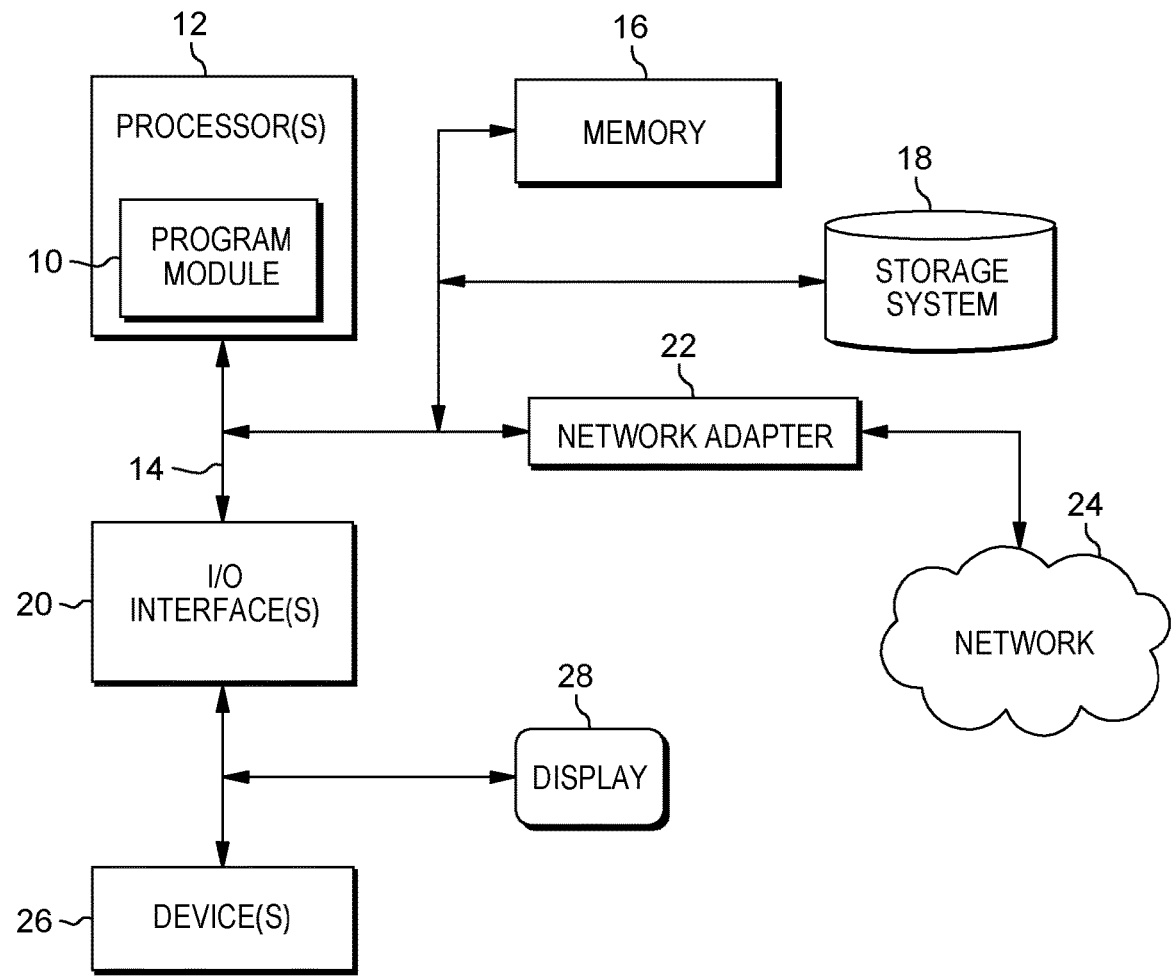
FIG. 8 is an exemplary block diagram of a computer system in which processes involved in the system, method, and computer program product described herein may be implemented.

FIG. 8 illustrates a schematic of an example computer or processing system that may implement any portion of computing devices 110, 120, 130 and 140, blockchain 400, nodes 500, validators 600, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor of coalescing transactions between trusted and un-trusted parties, the method comprising:

receiving, at the hardware processor, first transaction data from a computing device associated with a first trusted party, the first transaction data comprising a first pending transaction between the first trusted party and a second trusted party and a second pending transaction between the first trusted party and an un-trusted party;

receiving, at the hardware processor, second transaction data from a computing device associated with the second trusted party, the second transaction data comprising a third pending transaction between the second trusted party and the un-trusted party;

analyzing, at the hardware processor, the first and second transaction data to determine whether more than one trusted party has a pending transaction with the same un-trusted party;

determining, at the hardware processor, based on the analysis that the first trusted party and the second trusted party each have a pending transaction with the un-trusted party;

applying, at the hardware processor, a min-cost flow formulation to the first and second transaction data, wherein each of the first pending transaction, second pending transaction, and third pending transaction has an associated cost function and flow function, and the min-cost flow formulation analyzes the cost and flow functions of the first pending transaction, second pending transaction, and third pending transaction; and modifying the first pending transaction, the second pending transaction, and the third pending transaction based on a result of the min-cost flow formulation, the modification comprising removing the third pending transaction; and submitting, by the processor, to a transaction database shared by multiple computing nodes participating in a system based on a blockchain protocol, and for addition to a blockchain, the modifications to the first and second pending transactions, and the removing of the third pending transaction, for validation by said participating multiple computing nodes, wherein a number of transactions between first trusted party, the second trusted party and the un-trusted party is reduced, including reducing a number of communications between the first and second trusted parties and untrusted party on a network that require settlement at a transaction clearinghouse based on the first, second and third transactions.

2. The method of claim 1, wherein:

analyzing the first and second transaction data comprises generating a transaction graph, the transaction graph comprising an identification of the first trusted party, second trusted party, un-trusted party, first pending transaction, second pending transaction, and third pending transaction;

the determination that the first trusted party and the second trusted party each have a pending transaction with the un-trusted party is based on the transaction graph; and the min-cost flow formulation is applied to the transaction graph.

3. The method of claim 1, further comprising:

in response to determining that the first trusted party and the second trusted party each have a pending transaction with the un-trusted party, transmitting a proposal to modify the first pending transaction, second pending transaction, and third pending transaction to a computing device associated with the third party; and receiving an acceptance of the proposal from the computing device associated with the third party, wherein the modification of the first pending transaction, second pending transaction, and third pending transaction occurs in response to receiving the acceptance of the proposal from the computing device associated with the third party.

4. The method of claim 3, wherein the received acceptance of the proposed modification from the third party comprises the proposed modification signed by a private key of the third party.

5. The method of claim 3, further comprising:

transmitting the proposal to modify the first pending transaction, second pending transaction, and third pending transaction to at least one of the computing device associated with the first party and the computing device associated with the second party; and receiving an acceptance of the proposal from the at least one of the computing device associated with the first party and the computing device associated with the second party, wherein the modification of the first pending transaction, second pending transaction, and third pending transaction occurs in response to receiving the acceptance of the proposal from the at least one of the computing device associated with the first party and the computing device associated with the second party.

6. A system comprising:

at least one hardware processor configured to:

receive first transaction data from a computing device associated with a first trusted party, the first transaction data comprising a first pending transaction between the first trusted party and a second trusted party and a second pending transaction between the first trusted party and an un-trusted party;

receive second transaction data from a computing device associated with the second trusted party, the second transaction data comprising a third pending transaction between the second trusted party and the un-trusted party;

analyze the first and second transaction data to determine whether more than one trusted party has a pending transaction with the same un-trusted party;

determine based on the analysis that the first trusted party and the second trusted party each have a pending transaction with the un-trusted party;

apply a min-cost flow formulation to the first and second transaction data, wherein each of the first pending transaction, second pending transaction, and third pending transaction has an associated cost function and flow function, and the min-cost flow formulation analyzes the cost and flow functions of the first pending transaction, second pending transaction, and third pending transaction; and modify the first pending transaction, the second pending transaction, and the third pending transaction based on a result of the min-cost flow formulation, the modification comprising removing the third pending transaction; and submit, by the processor, for addition to a transaction database shared by multiple computing nodes participating in a system based on a blockchain protocol, and for addition to a blockchain, the modifications to the first and second pending transactions, and the removing of the third pending transaction, for validation by said participating multiple computing nodes, wherein a number of transactions between first trusted party, the second trusted party and the un-trusted party is reduced, including a reduced number of communications between the first and second trusted parties and untrusted party on a network that require settlement at a transaction clearinghouse based on the first, second and third transactions.

7. The system of claim 6, wherein:

analyzing the first and second transaction data comprises generating a transaction graph, the transaction graph comprising an identification of the first trusted party, second trusted party, un-trusted party, first pending transaction, second pending transaction, and third pending transaction;

the determination that the first trusted party and the second trusted party each have a pending transaction with the un-trusted party is based on the transaction graph; and the min-cost flow formulation is applied to the transaction graph.

8. The system of claim 6, the at least one hardware processor further configured to:

in response to determining that the first trusted party and the second trusted party each have a pending transaction with the un-trusted party, transmit a proposal to modify the first pending transaction, second pending transaction, and third pending transaction to a computing device associated with the third party; and receive an acceptance of the proposal from the computing device associated with the third party, wherein the modification of the first pending transaction, second pending transaction, and third pending transaction occurs in response to receiving the acceptance of the proposal from the computing device associated with the third party.

9. The system of claim 8, wherein the received acceptance of the proposed modification from the third party comprises the proposed modification signed by a private key of the third party.

10. The system of claim 8, the at least one hardware processor further configured to:

transmit the proposal to modify the first pending transaction, second pending transaction, and third pending transaction to at least one of the computing device associated with the first party and the computing device associated with the second party; and receive an acceptance of the proposal from the at least one of the computing device associated with the first party and the computing device associated with the second party, wherein the modification of the first pending transaction, second pending transaction, and third pending transaction occurs in response to receiving the acceptance of the proposal from the at least one of the computing device associated with the first party and the computing device associated with the second party.

11. A non-transitory computer readable medium comprising instructions that, when executed by at least one hardware processor, configure the at least one hardware processor to:

receive first transaction data from a computing device associated with a first trusted party, the first transaction data comprising a first pending transaction between the first trusted party and a second trusted party and a second pending transaction between the first trusted party and an un-trusted party;

receive second transaction data from a computing device associated with the second trusted party, the second transaction data comprising a third pending transaction between the second trusted party and the un-trusted party;

analyze the first and second transaction data to determine whether more than one trusted party has a pending transaction with the same un-trusted party;

determine based on the analysis that the first trusted party and the second trusted party each have a pending transaction with the un-trusted party;

apply a min-cost flow formulation to the first and second transaction data, wherein each of the first pending transaction, second pending transaction, and third pending transaction has an associated cost function and flow function, and wherein the min-cost flow formulation analyzes the cost and flow functions of the first pending transaction, second pending transaction, and third pending transaction; and modify the first pending transaction, the second pending transaction, and the third pending transaction based on the determination, the modification comprising removing the third pending transaction; and the instructions further configure at least one hardware processor to:

submit for addition to a transaction database shared by multiple computing nodes participating in a system based on a blockchain protocol, and for addition to a blockchain, the modifications to the first and second pending transactions, and the removing of the third pending transaction, for validation by said participating multiple computing nodes, wherein a number of transactions between first trusted party, the second trusted party and the un-trusted party is reduced, including a reduced number of communications between the first and second trusted parties and untrusted party on a network that require settlement at a transaction clearinghouse based on the first, second and third transactions.

12. The non-transitory computer readable medium of claim 11, wherein:

analyzing the first and second transaction data comprises generating a transaction graph, the transaction graph comprising an identification of the first trusted party, second trusted party, un-trusted party, first pending transaction, second pending transaction, and third pending transaction;

the determination that the first trusted party and the second trusted party each have a pending transaction with the un-trusted party is based on the transaction graph; and the min-cost flow formulation is applied to the transaction graph.

13. The non-transitory computer readable medium of claim 11, the instructions further configure at least one hardware processor to:

in response to determining that the first trusted party and the second trusted party each have a pending transaction with the un-trusted party, transmit a proposal to modify the first pending transaction, second pending transaction, and third pending transaction to a computing device associated with the third party; and receive an acceptance of the proposal from the computing device associated with the third party, wherein the modification of the first pending transaction, second pending transaction, and third pending transaction occurs in response to receiving the acceptance of the proposal from the computing device associated with the third party.

14. The non-transitory computer readable medium of claim 13, the instructions further configure at least one hardware processor to:

transmit the proposal to modify the first pending transaction, second pending transaction, and third pending transaction to at least one of the computing device associated with the first party and the computing device associated with the second party; and receive an acceptance of the proposal from the at least one of the computing device associated with the first party and the computing device associated with the second party, wherein the modification of the first pending transaction, second pending transaction, and third pending transaction occurs in response to receiving the acceptance of the proposal from the at least one of the computing device associated with the first party and the computing device associated with the second party.

* * * * *